United States Patent
Shutzberg et al.

(10) Patent No.: US 12,189,133 B1
(45) Date of Patent: Jan. 7, 2025

(54) SECUREMENT ARM FOR ELECTRONIC DEVICE

(71) Applicant: Apple Inc., Cupertino, CA (US)

(72) Inventors: Alison B. Shutzberg, San Francisco, CA (US); Christopher Patton, San Jose, CA (US); Ibuki Kamei, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/433,746

(22) Filed: Feb. 6, 2024

Related U.S. Application Data

(60) Provisional application No. 63/517,455, filed on Aug. 3, 2023.

(51) Int. Cl.
  *G02B 27/01* (2006.01)
  *G02C 5/16* (2006.01)
  *G02C 5/22* (2006.01)
  *G02C 11/00* (2006.01)

(52) U.S. Cl.
  CPC .......... *G02B 27/0176* (2013.01); *G02C 5/16* (2013.01); *G02C 5/2209* (2013.01); *G02C 11/10* (2013.01); *G02B 2027/0154* (2013.01); *G02B 2027/0178* (2013.01)

(58) Field of Classification Search
  CPC .... G02B 27/0176; G02C 5/16; G02C 5/2209; G02C 11/10
  See application file for complete search history.

(56) References Cited

U.S. PATENT DOCUMENTS

| | | | | |
|---|---|---|---|---|
| 5,815,126 A | * | 9/1998 | Fan | G02B 27/017 345/87 |
| 7,520,606 B2 | * | 4/2009 | Hogen | G02C 5/20 351/114 |
| 9,164,293 B2 | * | 10/2015 | Farnam | G02C 5/20 |
| 11,402,660 B1 | * | 8/2022 | Hoye | G02C 5/2263 |
| 2010/0053546 A1 | * | 3/2010 | Lanaro | G02C 5/16 351/114 |
| 2020/0371365 A1 | * | 11/2020 | Kamakura | G02B 27/0172 |
| 2022/0121032 A1 | * | 4/2022 | Serizawa | H04N 5/64 |

* cited by examiner

*Primary Examiner* — Sardis F Azongha
(74) *Attorney, Agent, or Firm* — Dorsey & Whitney LLP

(57) ABSTRACT

A securement arm for an optical device includes a first portion having a first electronic component, the first portion connected to a viewing frame of the optical device. The securement arm also includes a second portion having a second electronic component coupled to the first portion by a spring element. The spring element can include a plastic deformation element and an elastic element. The securement arm also includes an electrical connector extending through the spring element and electrically connecting the first electronic component and the second electronic component.

20 Claims, 11 Drawing Sheets

SECUREMENT ARM FOR ELECTRONIC DEVICE

CROSS-REFERENCE TO RELATED APPLICATION(S)

This claims priority to U.S. Provisional Patent Application No. 63/517,455 filed 3 Aug. 2023, and entitled "Securement Arm for Electronic Device," the disclosure of which is hereby incorporated by reference in its entirety.

FIELD

The described embodiments relate generally to electronic devices. More particularly, the present embodiments relate to head-mountable electronic devices.

BACKGROUND

Recent advances in portable computing have enabled head-mountable optical devices that provide augmented and virtual reality experiences to users. Various components of these devices, such as display screens, viewing frames, securement arms, speakers, batteries, and the like, operate together to provide an immersive and comfortable experience. However, the anatomy of each user's head is unique. One user's head can be larger than another's, or can be a different shape. Other anatomical features, including relative positions of a user's nose, forehead, and ears, can vary widely as well. The anatomical variety of heads presents a challenge for head-mountable devices designed for comfort and reliability.

In some optical devices, for example, securement arms that extend along, or make contact with, opposing sides of a user's head can be used to secure the device to the user's head. However, the dimensions, angles, shape, and other physical characteristics of the arms that may be sufficient to comfortably and reliably secure the device to one user's head may not be sufficient to comfortably and reliably secure the device to another user's head.

Additionally, optical devices can be used in a variety of different settings and during a variety of different activities. These can range from lying down still in bed to mountain biking or hiking outdoors. Thus, even for a single user, the securement arms of a head-mountable device that are comfortable and sufficient for securing the device during one activity may not be as well suited for another activity.

Furthermore, head-mountable optical devices can include a number of electronic components configured to operate together to produce an altered or virtual reality experience to the user. Users often desire lightweight, compact devices that are comfortable, portable, long lasting, and easily handled. Thus, the physical configuration of these electronic components, including batteries, speakers, processors, and so forth, affects the quality of the user's experience.

Accordingly, what is needed in the art are head-mountable devices and systems providing users having a wide variety of anatomical features and who participate in a wide variety of activities with comfortable and reliable components.

SUMMARY

In at least one example of the present disclosure, a head-mountable electronic device can include a viewing frame and a securement arm extending from the viewing frame. The securement arm can include a proximal portion connected to the viewing frame, the proximal portion including a first electronic component and a distal portion attached to the proximal portion by a spring element. The distal portion can include a second electronic component. The spring element can include an elastic element over molded onto a plastic deformation element. An electrical connector can extend through the spring element and electrically connect the first electronic component and the second electronic component.

In one example, the plastic deformation element can include through holes. In some examples, the plastic deformation element can include an elongated panel having flexible a tab extending from the panel. The flexible tab can interlock with the elastic element. In other examples, the plastic deformation element can include a metallic material and the elastic element comprises a silicon material. In some examples, the distal portion can include a first shell coupled to a second shell to define a prismatic volume and the second electronic component is disposed within the prismatic volume.

In some examples, a securement arm for an optical device can include a first portion having a first electronic component, the first portion connected to a viewing frame of the optical device. The securement arm can also include a second portion having a second electronic component coupled to the first portion by a spring element. In this example, the spring element can include a plastic deformation element and an elastic element. The securement arm can also include an electrical connector extending through the spring element and electrically connecting the first electronic component and the second electronic component.

In at least one example of the present disclosure, the plastic deformation element can include an angle adjustment range between about −30° and about +30°. The elastic element can include an angle adjustment range between about 0° and about 10°. In some examples, the elastic element can include an elongated sheet metal panel. The plastic deformation element can include a bespoke mechanism. In this example, the bespoke mechanism can include a crown gear engagement feature. The crown gear engagement feature comprises a push button that disengages the crown gear to adjust an angle of the spring element when pressed and engages the crown gear when released. In one example, the plastic deformation element can include a friction hinge.

In some examples, the plastic deformation element can include a first material and the elastic element can include a second material. The second material can be at least partially embedded within the first material. In this example, the first material can include a stainless steel and the second material comprises nitinol. In an example, the plastic deformation element can include a pliable material having a first tempered region and the elastic element can include the pliable material having a second tempered region. In this example, the second tempered region can include a different yield strength than the first tempered region.

In at least one example of the present disclosure, a securement arm for an optical device includes a proximal portion connected to a viewing frame of the optical device and a distal portion attached to the first portion by a spring element. In some examples, the proximal portion includes a first electronic component and the distal portion includes a second electronic component. The spring element can include a plastic deformation element and an elastic element. An electrical connector can extend through the spring element and electrically connect the first electronic component and the second electronic component. In this example, the securement arm further includes a first interposer at least partially disposed within the first portion of the securement arm. At least a portion of the spring element is connected to the first interposer and at least one of an adhesive, a barb, or a snap feature is disposed between an outer surface of the first interposer and an inner surface of the first portion of the securement arm. In some examples, the distal portion of the securement arm can include a second interposer at least partially disposed within the distal portion and a portion of the spring element can be connected to the second interposer.

In some examples, the first interposer can be connected to the spring element by at least one of a laser weld, a fastener, an ultrasonic weld, or a rivet. The electrical connector can include a planar flex or a cable. In some examples, the first electronic component can include a battery and the second electronic component can include a speaker.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
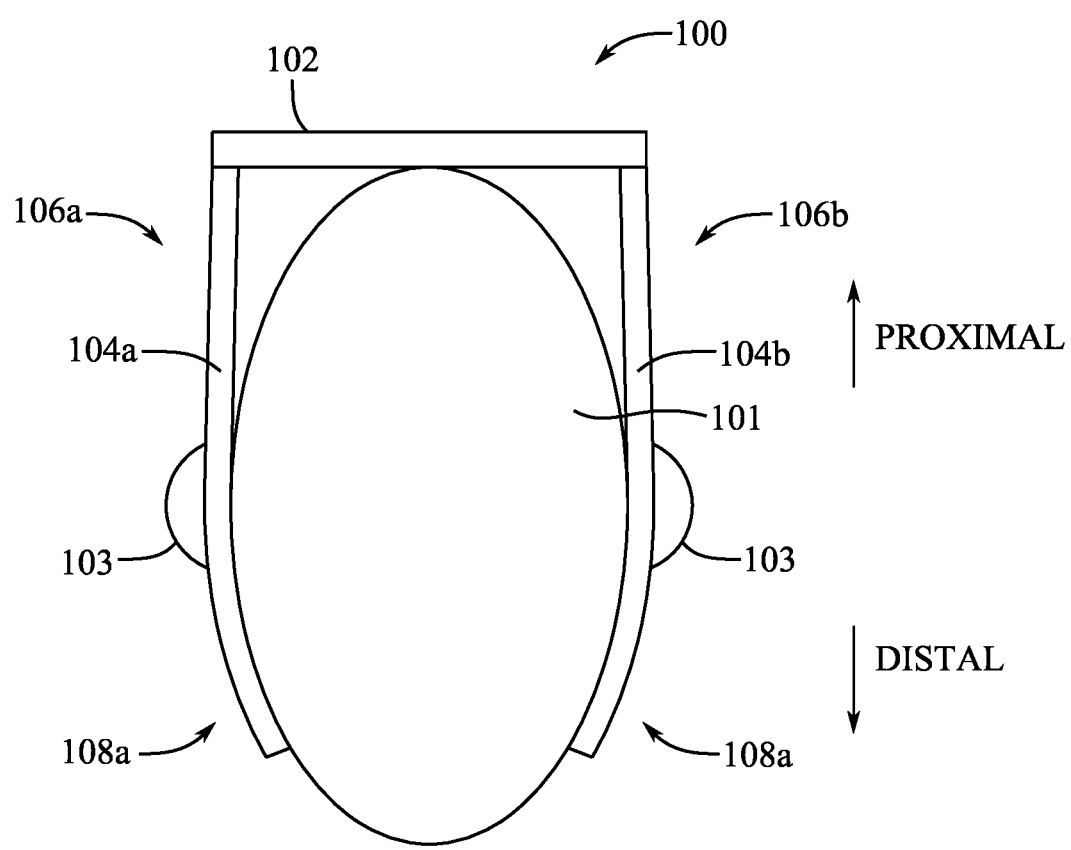
FIG. 1 shows a top view of an example of a head-mountable electronic device worn by a user.

Detailed reference will now be made to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to electronic devices. More particularly, the present disclosure relates to head-mountable electronic devices. In at least one example, a head-mountable device can include a viewing frame and a securement arm extending from the viewing frame. Examples of head-mountable electronic devices can include virtual reality or augmented reality devices that include an optical component. In the case of augmented reality devices, optical eyeglasses can be worn on the head of a user such that optical lenses and/or optical displays are positioned in front of the user's eyes. In another example, a virtual reality device can be worn on the head of a user such that a display screen is positioned in front of the user's eyes. The viewing frame can include a housing or other structural component supporting or housing the optical component, for example lenses or screens.

Examples of the present disclosure can include a securement arm extending from the viewing frame, which can be fixed in position relative to the viewing frame or rotatably secured thereto. An optical electronic device can include two opposing securement arms that can apply pressure to or around a user's head to maintain the viewing frame resting on the user's nose and/or cheeks. In some examples, the securement arms can rest on top of the user's ears to assist in securing the head-mountable optical device to the head of the user.

The securement arm can include multiple portions and one or more electronic components used to operate the head-mountable electronic device. These components can include any components used by the head-mountable electronic device to produce a virtual or augmented reality experience. For example, electronic components of the securement arm can include one or more speakers, processors, batteries, circuitry components including wires and circuit boards, or any other electronic components used in the head-mountable device to deliver augmented or virtual reality visuals, sounds, and other outputs. Disposing various electronic components within the securement arm reduces weight and space needed for the viewing frame and lenses and/or display screens of the device. This redistributed weight can relieve pressure of sensitive features like the user's nose and cheeks to create a more comfortable experience. This weight distribution can also be used to balance weight from the front of the device (at the viewing frame) to the back of the device (at the distal ends of the securement arms), resulting in a more secure and comfortable experience.

In examples where the securement arm includes multiple portions, a first portion can include a first electronic device and a second portion can include a second electronic device. The first portion can be connected to a second portion at a spring element and the second portion can include a second electronic device. In at least one example, the first electronic device and the second electronic device can be electrically connected with an electrical connector extending through the spring element. The spring element can be adjusted or bent so that the second portion can adjust to be disposed at an angle of the second portion relative to the first portion. The electrical connector can extend through the spring element such that bending or angling of the second portion at the spring element does not affect the electrically connectivity of the first electrical component with the second electrical component via the electrical connector.

For additional customization, the spring element can include multiple adjustment features to ensure a proper and consistent fit. For example, the spring element can include a plastic deformation element and an elastic element. In other words, the plastic deformation element can be adjusted and set to provide a consistent fit and then the elastic element can provide a more dynamic fitting for various actions such as donning and doffing the head-mountable optical device or for a more flexible securement arm for greater comfort during movements.

Head-mountable electronic devices, such as head-mountable optical devices delivering virtual and augmented reality experiences, can be used in a variety of different settings and during a variety of activities. For example, a user may lie down on a sofa or a bed while watching a movie or playing a game with a head-mountable virtual reality device. That same device, or some other augmented reality device, such as electronic glasses, can be used while exercising indoors on an exercise machine. Similarly, devices like augmented reality glasses can be used while being active outdoors, either while hiking, biking, or swimming. The devices of the present disclosure include components, such as securement arms, which can be adapted to effectively secure head-mountable devices to the user during any of the various activities in which the user participates.

In addition, the head measurements and anatomical features of each user vary such that a securement arm of the same length, shape, and curvature, may not be appropriate for every user. For example, some heads are more round than others. Some heads are larger or smaller and the position of a user's nose relative to their eyes can vary. The position of a user's ears relative to their nose or forehead can vary from one user to another such that a set of securement arms that effectively secure a head-mountable device to one user may not effectively secure the same device to anther user.

In addition, manufacturing individualized arms for each unique customer can be burdensome and often economically unfeasible. The head-mountable electronic devices of the present disclosure include securement arms and components that can be altered and customized to each user and for each activity. The same user can adjust the securement arms of a device, for example, to pressure more tightly or wrap further around his or her head when using the head-mountable device for exercise or other active scenarios. The same user can readjust the securement arms for a more comfortable fit while using the head-mountable device for less active scenarios, including lying down, sitting, or walking. In addition, some head-mountable devices may be used by multiple people, including multiple people in a household or business office, with each person having a different head geometry. Securement arms for devices described herein can be customized for the same device to be comfortably and effectively used by each of the multiple individuals using the device.

In one example, the second portion can be adjusted relative to the first portion of the securement arm to change the angle of the two portions relative to one another and further have an elastic element and a plastic deformation element. In one example, the second portion can be a distal portion and the first portion can be a proximal portion secured to the viewing frame. The second portion can adjust by setting a spring element to an initial angle relative to the proximal portion. The spring element can be further adjusted elastically to further customize the angle of the distal portion relative to the proximal portion. In other words, the plastic deformation element can be considered a coarse adjustment and the elastic element can be considered a fine adjustment. In such an example, the second distal portion can be shaped such that when the second portion is adjusted, the second portion changes angles or curvature relative to the first proximal portion at an initial set angle and then further adjusted elastically for temporary adjustment or for finer adjustments. In this way, the overall curvature of the securement arm can be adjusted and customized to each user or for a single user participating in different activities.

These and other embodiments are discussed below with reference to FIGS. 1-11B. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates a top view of an example of a head-mountable electronic device 100 worn on the head 101 of a user. The device 100 can include a viewing frame 102 configured to secure one or more optical lenses or display screens in front of the eyes of the user. The device 100 can also include one or more securement arms 104a, 104b secured to the viewing frame 102 and extending distally toward the rear of the user's head 101. In the illustrated example, the securement arms 104a, 104b extend over the user's ears 103 and curve along with the user's head 101. The securement arms 104a, 104b can apply opposing pressures to the sides of the user's head 101, as shown, to secure the device 100 to the user's head 101. The securement arms 104a, 104b can also rest on the user's ears 103 and secure the device 100 via friction between the securement arms 104a, 104b and the head 101.

As noted, the securement arms 104a, 104b can also curve along with the curve of the user's head 101. In at least one example, the securement arms 104a, 104b can include a first proximal portion 106a, 106b and a second distal portion 108a, 108b, respectively. The distal portion 108a, 108b of each arm 104a, 104b can be curved or disposed at an angle relative to the first proximal portion 106a, 106b such that at least a portion of each arm 104a, 104b makes contact along a length of the side of the user's head. In the illustrated example of FIG. 1, at least the distal portions 108a, 108b of the arms 104a, 104b curve with the user's head 101 to contact the head 101. In addition, the arms 104a, 104b can extend distally and curve around a portion of the back of user's head 101, as shown, to hook around the head 101 and prevent the viewing frame 102 from being pulled forward proximally off the face/head 101 of the user.

However, as noted above, the head 101 of the user can be a unique shape and size with a unique position of each ear 103 such that the curvature of the arms 104a, 104b of the device 100 shown in FIG. 1 may not be a match for the curvature and anatomy of the head of a different user. In general, the hooked arms 104a, 104b around the sides and rear of the head 101 in addition to the increased contact area and/or length between the arms 104a, 104b and head 101 improve the resistance of the arms 104a, 104b to forces pulling the viewing frame 102 proximally off the user's head 101. Such forces can arise from jostling and bumping during normal use of the device 100 or more detrimentally during falls or contact with other objects during use. Thus, the curvature of the securement arms 104a, 104b, and more particularly the curvature of the distal portions 108a, 108b of the arms 104a, 104b, which can be effective for retaining the device 100 on the head 101 shown in FIG. 1, may not be effective for a user with a head of a different size or shape.

Any of the features, components, and/or parts, including the arrangements and configurations thereof shown in FIG. 1 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1.

Figure 2A:
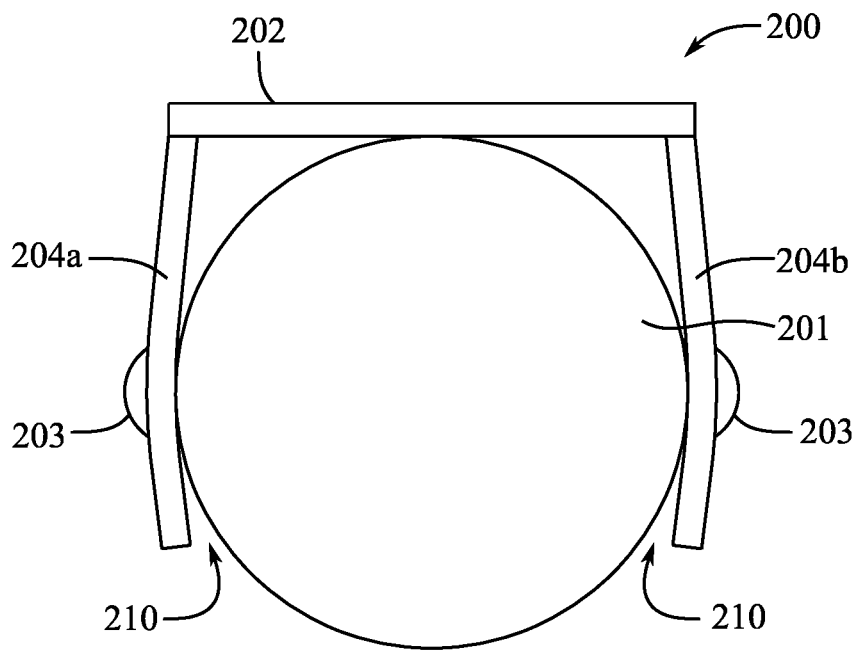
FIG. 2A shows a top view of an example of a head-mountable electronic device worn by a user.

A user having a head 201 of a different size and shape as that of the head 101 shown in FIG. 1 is shown in FIG. 2A. The same or similar head-mountable electronic device 200 can include a viewing frame 202 secured, at least in part, to the user's head 201 via one or more securement arms 204a, 204b. As show, the securement arms 204a, 204b can extend distally along opposing sides of the head 201. In the example shown, the arms 204a, 204b can extend over the user's ears 203 and toward the rear of the user's head 201. However, due to the shape of the user's head 201, the curvature of the arms 204a, 204b results in a gap 210 between the head 201 and the arms 204a, 204b.

Figure 2B:
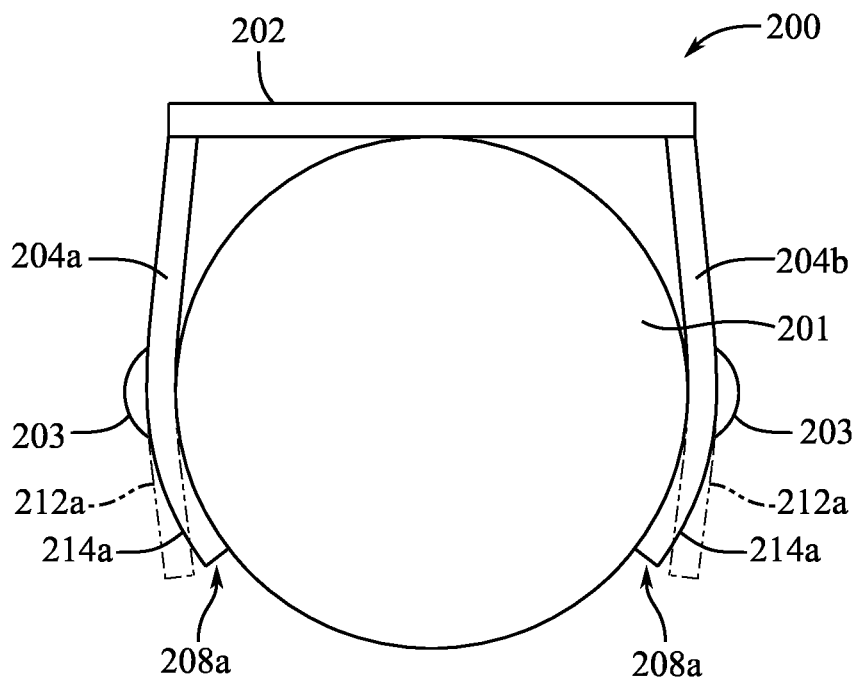
FIG. 2B shows a top view of an example of a head-mountable electronic device worn by a user.

In at least one example, the arms 204a, 204b can be configured to be adjusted to eliminate the gap 210 and increase the contact area and/or length between the arms 204a, 204b and the head 201. The adjustable arms 204a, 204b can also be reconfigured to hook further around the user's head 201 to secure the device 200 more effectively to the head 201. As shown in FIG. 2B, the arms 204a, 204b include a distal portion 208a, 208b, respectively, that can be adjusted to curve with the profile and anatomical features of the user's head 201 as shown. The first position 212a, 212b of the distal portions 208a, 208b of the arms 204a, 204b, which results in the gap 210 shown in FIG. 2BA is shown in dotted lines in FIG. 2B. An adjusted second position 214a, 214b of arms 204a, 204b are shown conforming to a curvature of the user's head 201. The distal portion 208a, 208b of each arm 204a, 204b can be adjusted by the user to accommodate the user's head 201 as shown to eliminate the gap 210 and more securely fasten or hold the device 200 onto the user's head 201.

Any of the features, components, and/or parts, including the arrangements and configurations thereof shown in FIGS. 2A and 2B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 2A and 2B.

Figure 3:
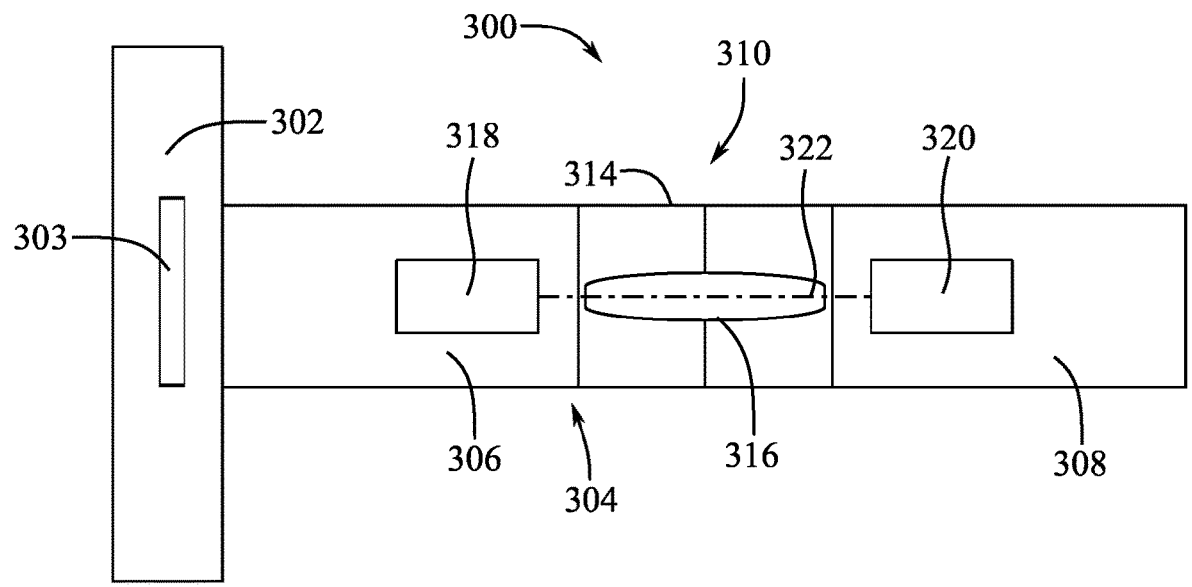
FIG. 3 shows a side view of an example of a head-mountable device.

FIG. 3 shows a side view of an example of a head-mountable optical device 300, including a viewing frame 302, and a securement arm 304 extending from the viewing frame 302. As noted above, in some examples, the securement arm 304 can be hingedly or rotatably connected to the viewing frame 302. In some examples, the securement arm 304 can be fixedly or unmovably attached or secured to the viewing frame. In at least one example, the securement arm 304 can include a first portion 306 including a first electronic component 318 and a second portion 308 attached to the first portion 306 with a spring element 310. The second portion 308 can include a second electronic component 320. Additionally, at least one example can include an electrical connector electronic circuitry component 322 extending through the spring element 310 and electrically connecting the first electronic component 318 and the second electronic component 320.

As used herein, the term "spring element" can refer to a structure or component enabling one portion of the arm 304 to laterally extend or move relative to another portion, for example the second portion 308 relative to the first portion 306. In some examples, the first and second portions 306, 308 can be separate pieces such that the spring element 310 includes one or more structures connecting both separate pieces. In other words, the spring element 310 links and/or associates the first and second portions 306, 308 through the spring element 310. In some examples, the electrical connector or electronic circuitry component 322 can extend through the spring element 310. More details regarding various examples of spring elements and plastic deformation elements and elastic element structures are given below with reference to other figures.

In some examples, the arm 304 can include the distal portion 308 and the proximal portion 306 beginning proximally where the proximal portion 306 connects (either rigidly or rotatably) to the viewing frame 302 and extending along a major length distally to a distal termination of the distal portion 308. In at least one example, a major length of the distal portion 308 is about 75% or less than a total major length of the arm 304. In at least one example, the distal portion is about 60% or less or about 50% or less of the total length of the arm 304. In some examples, the distal portion 308 of the arm 304 can be about 40% or less, about 30% or less, about 20% or less, about 10% or less, or about 5% or less than a total length of the arm 304. Correspondingly, the proximal portion can be at least about 25% of the total length of the arm 304 in one example, or at least about 40% of the total length of the arm 304 in another example. In one or more other examples, the proximal portion 306 can be at least about 50%, at least about 60%, at least about 70%, at least about 80%, at least about 90%, or at least about 95% of the total length of the arm 304.

The first and second electronic components 318, 320 can include any number of electronic components configured to operate and produce a virtual or augmented reality experience to the user through the device 300. For example, the first electronic component 318 can include a projector, waveguide, speaker, processor, or memory component and the second electronic component 320 can include a battery or any other component including those described with reference to the first electronic component 318. In examples where the electronic component 318 includes a projector and/or a waveguide, the projector and/or waveguide can be configured to project and light that is display on a window 303 secured to the viewing frame 302. The window 303 can include an optically transparent material. The window 303 can include an optical lens. The window 303 can include a transparent window through which light passes without redirecting light or vision correcting geometries. In examples where the second electronic component 320 includes a battery, the battery can be connected to the first electronic component 318 via the electronic circuitry component 322 to deliver power to the first electronic component 318.

In at least one example, the electronic circuitry component 322 can include one or more electrically conductive wires, flexes, resistors, circuit boards, or any other electronic circuitry components connecting the first electronic component 318 and the second electronic component 320. In at least one example, the electronic circuitry component 322 can include an electrical cable or wire. In some examples, the electrical cable or wire can include a planar flex.

The first electronic component 318, the second electronic component 320, and/or the electronic circuitry component 322 can be disposed within the internal volume such that the components are hidden from view. Alternatively, one or more of the components shown 318, 320, and 322 can be disposed on the housing. The electronic circuitry component 322 can extend through the spring element 310 such that the functionality of the spring element 310 and the electronic circuitry component 322 is not hindered.

In at least one example, the device 300 can include an optical device and the first portion 306 of the arm 304 can be referred to as a proximal portion. In such an example, the second portion 308 of the arm 304 can be referred to as a distal portion. The terms "proximal" and "distal" can be used to reference the position of various components of devices described herein relative to the viewing frame 302 of the device 300. The orientation of the "proximal" and "distal" directions relative to devices described herein is shown in FIG. 1.

Referring to FIG. 3, in an example, the spring element 310 can include a plastic deformation element 314 that can include a housing defining an external surface and an interior volume. As used herein, the term "plastic deformation" can refer to a structure or component that can change shape and retain the shape without a sustained force applied to the structure or component. In other words, the plastic deformation element 314 can be adjusted from an initial position to a final position by applying a force or adjusting a mechanism such that when the force is removed, or the mechanism is adjusted the plastic deformation element 314 retains its new shape or adjustment. Specifically, the plastic deformation element 314 can be adjusted such that an angle between the proximal portion 306 and the distal portion 308 is altered.

In some examples, the spring element 310 can include an elastic element 316 that can either be disposed within and/or adjacent to the plastic deformation element 314. In some examples, the plastic deformation element 314 can be disposed within the elastic element 316. In other examples, the elastic element 316 can be proximal to or distal to the plastic deformation element. The elastic element 316 can include a housing defining an external surface and an interior volume. As used herein, the term "elastic element" can refer to a structure or component that can change shape under a force and resume the initial shape when the force is withdrawn or no longer applied to the structure or component. In other words, the elastic element 316 can be adjusted from an initial position applying a force or adjusting the elastic element 316 the elastic element 316 returns to its initial shape or angle when the force is removed. Specifically, the elastic element 316 can be subjected to a force such that an angle between the proximal portion 306 and the distal portion 308 is altered and can return to the initial angle when the force is released.

Any of the features, components, and/or parts, including the arrangements and configurations thereof shown in FIG. 3 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 3.

Figure 4A:
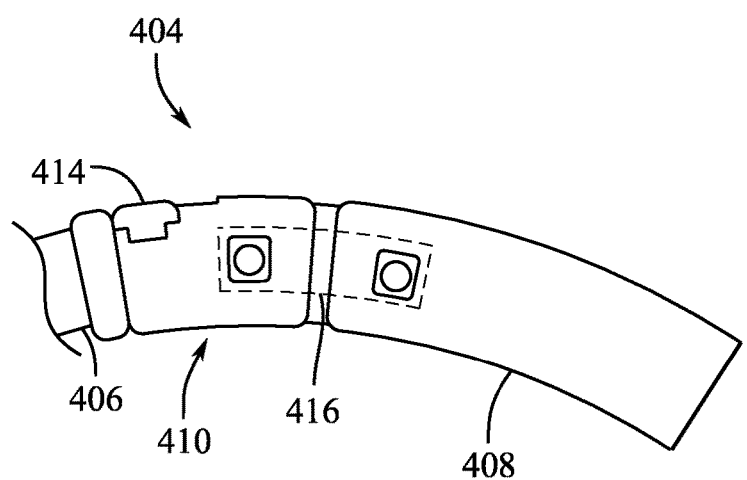
FIG. 4A shows a side view of an example of a securement arm of a head-mountable device.

FIG. 4A shows a side view of an example of a securement arm 404 of a head-mountable device. The securement arm 404 can include a first portion 406 and a second portion 408. As discussed with reference to FIG. 3, the first portion 406 can include a first electronic component disposed therein and the first portion 404 can be connected to a viewing frame of an optical device (not shown). The second portion 408 can also include a second electronic component disposed within the second portion 408. An electrical connector can extend through the spring element 410 to connect the first and second electronic components. Referring to FIG. 4A, the second portion 408 is coupled to the first portion 406 by a spring element 410. The spring element 410 can include a plastic deformation element 414 and an elastic element 416. In some examples, the plastic deformation element 414 can include an adjustment mechanism. For example, a bespoke mechanism or hinge explained in detail below. In other examples, the plastic deformation element 414 can comprise a material that can be plastically deformed. The elastic element 416 can include a material that can bend when placed under a certain stress and return to its initial shape. In some examples, the elastic element 416 can include an elongated sheet metal panel. Other materials or alloys can be used. In some examples, the elastic element 416 can include a polymer, a metal alloy, a metal ceramic, or any other suitable natural or synthetic material.

The elastic element 416 can be configured to be elastic under certain controlled conditions. Specifically, the elastic element 416 can retain elastic properties when the force applied to the elastic element 416 is maintained under a certain limit and under a certain number of cycles. It is understood that any force higher than the shear strength of the material can cause the elastic element 416 to yield and no longer exhibit elastic properties. Further, it is understood that any material exhibits a cyclic fatigue life, which when cyclic fatigue occurs, the material will lose its elastic properties. As such, in some examples, the spring element can include a torque range between about 15 N*mm and about 50 N*mm. In some examples, the torque range of the elastic element 416 can be about 90% or less, about 80% or less, about 70% or less, about 50% or less, or about 30% or less than the torque range between about 15 N*mm and about 50 N*mm. Correspondingly, the elastic element 416 can retain elastic properties through a cycle range between about 100 cycles and about 500 cycles at the given torque range. The cycle range can be at least about 250% of the total cycles at a torque of about 50 N*mm in one example, or at least about 150% of the total cycles at a torque of about 50 N*mm in another example. In one or more other examples, the total cycles can be at least about 50%, at least about 60%, at least about 70%, at least about 80%, at least about 90%, or at least about 95% of the total cycle range at the maximum torque value of the elastic element 416.

Figure 4B:
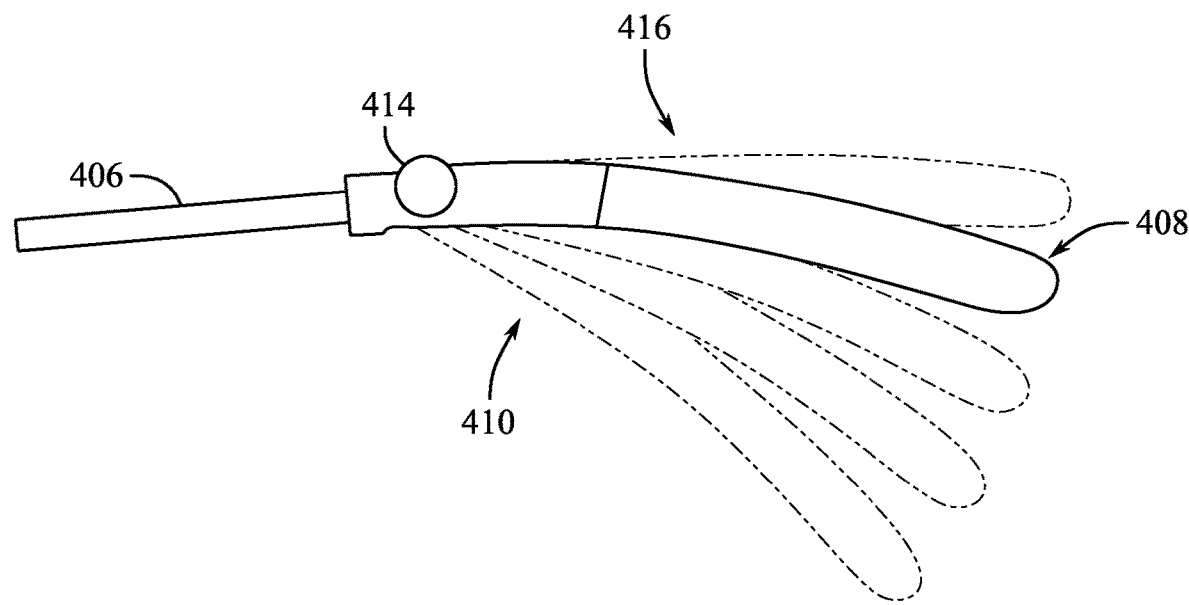
FIG. 4B shows a top view of the securement arm of FIG. 4A in various adjusted positions.

FIG. 4B shows a top view of the securement arm 404 in various adjusted positions. For example, the plastic deformation element 414 can include an angle adjustment range between about −30° and about +30°. The angle adjustment range can be defined as the angle between a linear proximal portion 406 of the securement arm 404 and the linear distal portion 408. In some examples, the angle adjustment of the plastic deformation element 414 can occur at a pivot point, and in other examples, the angle adjustment can be spread over a length of the spring element 410. For example, the adjustment angle can be a gradual bend of the spring element 410 from a distal end to a proximal end of the spring element 410. In some examples, the angle adjustment range can be from between about −25° and about +25°, between about −15° and about +15°, between about −10° and about +10°, or between about −5° and about +5°. In some examples, the angle adjustment of the plastic deformation element 414 can occur in increments. For example, the plastic deformation element 414 can be adjusted in increments of 5° or 10°. In other examples, the angle adjustment of the plastic deformation element 414 can be continuous. The elastic element 416 also can include an angle adjustment range. For example, the elastic element 416 can include an angle adjustment range between about −10° and about +10°. In other examples, the elastic element 416 can include an angle adjustment range between about 0° and about +10° or between about −5° and about +5°.

Figure 4C:
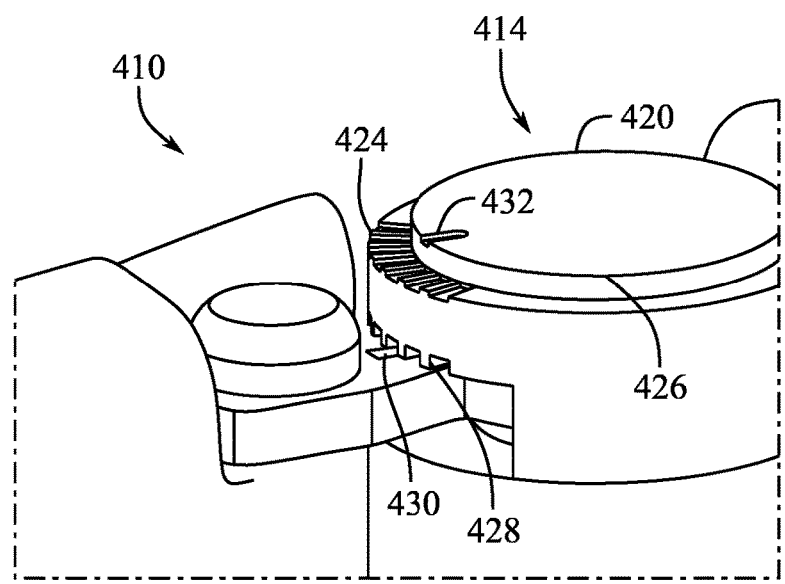
FIG. 4C shows a proximal view of the plastic deformation element of a spring element of the securement arm of FIG. 4A.

FIG. 4C shows a proximal view of the plastic deformation element 414 of a spring element 410 of securement arm 404. In some examples, the plastic deformation element 414 can include a bespoke mechanism 420. The bespoke mechanism 420 can change the adjustment angle in increments as described above. For example, the bespoke mechanism 420 can include a crown gear engagement feature 424. In some examples, the crown gear engagement feature 424 can include a push button 426 that disengages a crown gear 428 to adjust an angle of the spring element 410 when pressed and engages the crown gear 428 when released. In other words, the crown gear engagement feature 424 can include a tooth 430 that engages with the crown gear 428. When the button 426 is pressed, the tooth disengages and the distal portion 408 of the securement arm 404 can rotate between the angle adjustment ranges. The user can adjust to the desired angle and then release the button 426. The tooth 430 then reengages with the crown gear 428 at the adjusted angle. In some examples, the button 426 can include a position indicator 432 that aligns with the tooth 430 to indicate the angle position of the bespoke mechanism 420.

Any of the features, components, and/or parts, including the arrangements and configurations thereof shown in FIGS. 4A-4C can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 4A-4C.

Figure 5A:
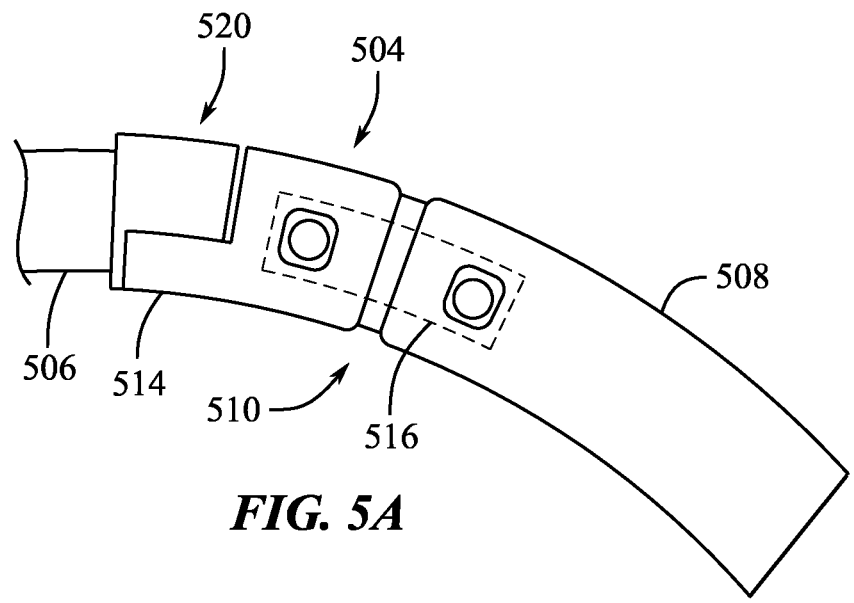
FIG. 5A shows a side view of an example of a securement arm of an optical device.

FIG. 5A shows a side view of an example of a securement arm 504 of a head-mountable device. The securement arm 504 can include a first portion 506 and a second portion 508. As discussed with reference to FIG. 3, the first portion 506 can include a first electronic component disposed therein and the first portion 504 can be connected to a viewing frame of an optical device (not shown). The second portion 508 can also include a second electronic component disposed within the second portion 508. An electrical connector can extend through the spring element 510 to connect the first and second electronic components. Referring back to FIG. 5A, the second portion 508 is coupled to the first portion 506 by a spring element 510. The spring element 510 can include a plastic deformation element 514 and an elastic element 516. In some examples, the plastic deformation element 514 can include an adjustment mechanism. For example, a friction hinge 520.

Figure 5B:
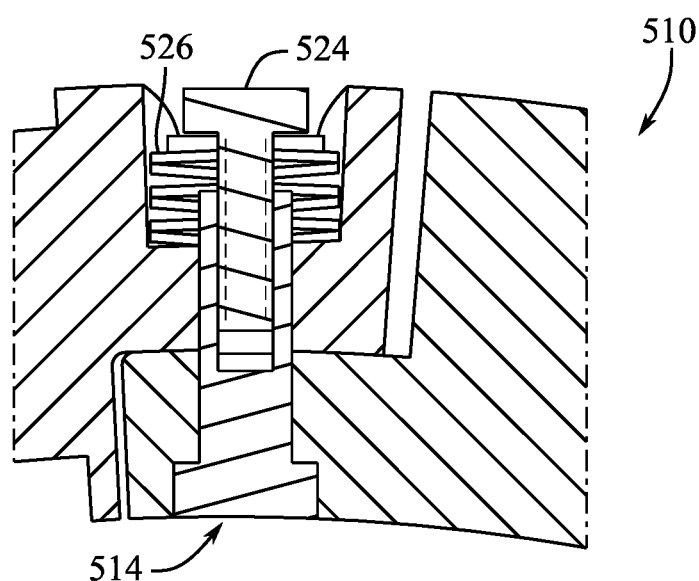
FIG. 5B shows a cross-sectional view of the spring element of the securement arm of FIG. 5A.

FIG. 5B shows a cross-sectional view of an example friction hinge 520. In some examples, the plastic deformation element 514 can include a set screw 524 and a resistance spring 526. To adjust the plastic deformation element 514 to a desired angle, the user can turn the set screw 524 in a first direction (e.g., counterclockwise) to loosen the set screw and the resistance spring 526. The user can then adjust the angle to a desired degree and then tighten the set screw 524 to lock the plastic deformation element 514 into the desired degree. In some examples, the friction hinge can further include notches to lock in the adjustment angle in increments. The set screw adjustment can be by hand in some examples or can require a tool in other examples.

Referring to FIG. 5A, the spring element 510 also includes an elastic element 516. The elastic element 516 can include a material that can bend when placed under a certain stress and return to its initial shape. For example, the elastic element 516 can include an elongated sheet metal panel. The sheet metal panel can be retained in the securement arm 504 with bolts or rivets in some examples. The elastic element 516 can be configured to be accessible to replace and/or repair to address any potential failure of the elastic element due to user error or to extend the useable life of the elastic element due to cyclic stresses.

Any of the features, components, and/or parts, including the arrangements and configurations thereof shown in FIGS. 5A-5B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 5A-5B.

Figure 6A:
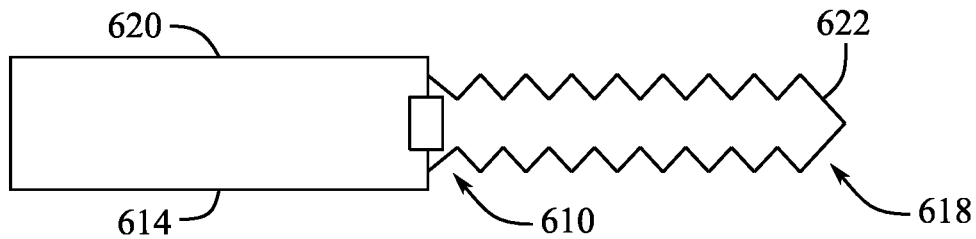
FIG. 6A shows a graphic side view of a spring element of a securement arm for an optical device.

FIG. 6A shows an example spring element 610. The spring element 610 can be embedded or otherwise disposed within a securement arm of an optical device. In some examples, the spring element 610 can include a plastic deformation element 614 and an elastic element 618. In an example, the plastic deformation element can include a first material 620 and the elastic element can include a second material 622. In some examples, the second material 622 can be at least partially embedded within the first material 620. In some examples, the first material 620 and the second material 622 can be welded together. In other examples, the first material 620 and the second material 622 can be soldered, riveted, fastened, or bonded together. In other examples, the first material 620 and the second material 622 can be layered or arranged to improve the plastic and elastic properties of the spring element 610.

Figure 6B:
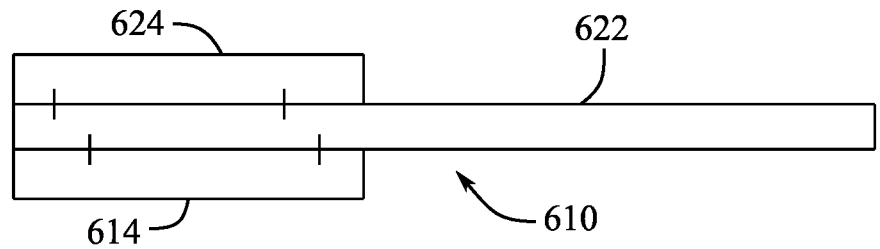
FIG. 6B shows a graphic top view of a spring element of a securement arm.
Figure 6C:
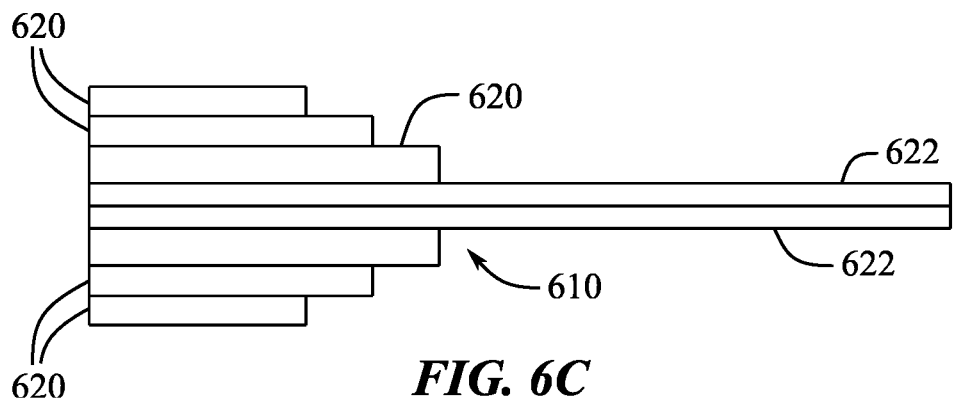
FIG. 6C shows a graphic top view of a spring element of a securement arm.

FIGS. 6B-6C show a top view of an example arrangement of the spring element 610 including a plastic deformation element 614 and an elastic element 618. In some examples, the elastic element 618 can be embedded within the plastic element 614. The elastic element 618 can extend from the plastic element 614, which can make the elastic element 618 more pliable. In some examples, the elastic element 618 can include multiple layers as shown in FIG. 6C. The plastic element 614 can also include multiple layers. The layers and elements can be bonded to each other in a manner that enhances the plastic and elastic properties of the plastic deformation element 614 and an elastic element 618, respectively. In some examples, the plastic deformation element 614 can include the first material 620 and the elastic element can include a second material 622. For example, the first material 620 can include a stainless steel and the second material 622 can include nitinol. However, other suitable materials, alloys, composites, and mixtures can be included.

Figure 6D:
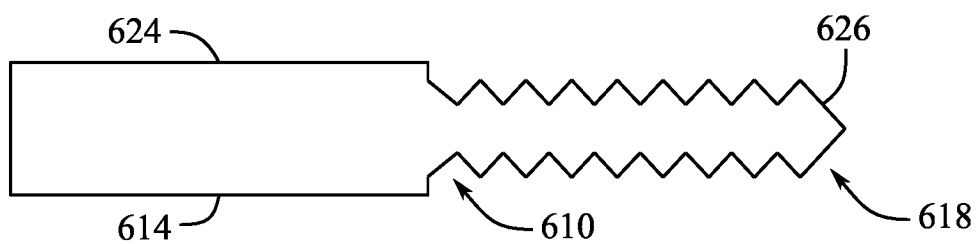
FIG. 6D shows a graphic side view of a spring element of a securement arm for an optical device.

FIG. 6D shows a side view of an example of a securement arm 604 of a head-mountable device. Similar to the other embodiments discussed above, the securement arm 604 can include a spring element 610 having plastic deformation element 614 and elastic element 618. In some examples, the plastic deformation element can include a pliable material having a first tempered region 624 and the elastic element comprises the same pliable material having a second tempered region 626. In this example, the second tempered region 626 can include a different yield strength than the first tempered region 624. In other words, the plastic deformation element 614 and elastic element 618 are of the same material. For example, the spring element 610 can include an alloy steel, such as 5160H, also known as AISI 5160H or SAE 5160, which is a high carbon chromium spring steel. A spring element 610 manufactured from AISI 5160H steel can provide a high tensile strength, toughness, and good fatigue resistance. This allows the spring element 610 to be designed to a lower mass because of the higher tensile properties over other high carbon non-alloyed steels.

In some examples, the material has undergone a different manufacturing or treating process, which provides different elastic and/or plastic properties (e.g., tempering). For example, the plastic deformation element 614 can include a steel material or alloy that has been tempered to between about 400° C. and about 450° C. In some examples, the elastic element 618 can be tempered to about 425° C. This renders the steel tougher and provides more plastic properties. The elastic element 618 can include the same steel material or alloy, but that has been tempered to between about 180° C. and about 220° C. In some examples, the elastic element 618 can be tempered to about 200° C. The lower tempering temperature provides the steel more elastic properties. As such, the spring element 610 can include both the plastic deformation element 614 and elastic element 618, but have the same material and not require bonding, welding, or layering of materials.

Any of the features, components, and/or parts, including the arrangements and configurations thereof shown in FIGS. 6A-6D can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 6A-6D.

Figure 7A:
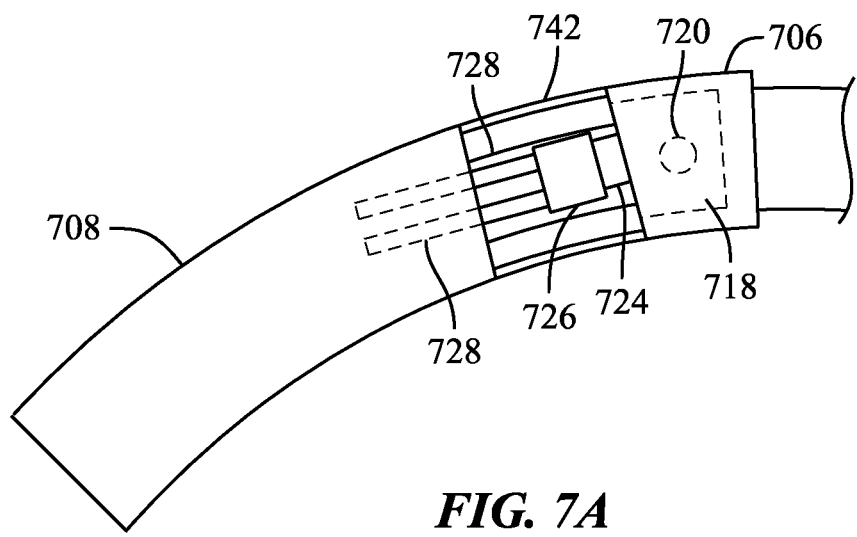
FIG. 7A shows a partial cross-sectional view of a securement arm of an optical device.

FIG. 7A shows a partial cross-sectional view of a securement arm 704 of an optical device. In at least one example, the securement arm 704 can include a first portion 706 and a second portion 708 attached to the first portion 706 with a spring element 710. In some examples, the spring element 710 can include a plastic deformation element 714 and an elastic element 716. The plastic deformation element 714 can be disposed proximal to the elastic element 716, with the elastic element 716 at least partially disposed within the plastic deformation element 714. In the example shown in FIG. 7A, the spring element 710 can include both materials configured to plastically and elastically deform as well as elements shaped for improved elastic and plastic actions. The plastic deformation element 714 can include a stainless-steel material. The stainless steel can include an anchor portion 718 configured to retain the spring element 710 within the first portion 706. The anchor portion 718 can include a rivet, a screw 720, or an adhesive to further hold the spring element 710 within the first portion. In some examples, the anchor portion 718 can be an interposer.

In some examples, the plastic deformation element 714 can also include a plastically deforming portion 724. In some examples, the plastically deforming portion 724 can include a planar steel panel section. The steel panel section can be configured to plastically deform when a force is applied to the second distal portion 708. In some examples, the force can be greater than 5 N. In other examples, the force can be greater than 3 N, greater than 6 N, greater than 8 N or greater than 10 N. In some examples, the steel panel can have a thickness between about 0.3 mm and about 1 mm. In some examples, the steel panel can have a thickness of between about 0.35 mm and about 0.7 mm. In other examples, the steep panel can have a thickness of about 0.6 mm. The plastic deformation element 714 can further include a coupling section 726, where the elastic element 716 can be joined to the plastic deformation element 714.

In some examples, the plastic deformation element 714 can include a rod 728. The rod 728 can be configured to adjust elastically under the above forces without plastically deforming. For example, the rod 728 can include nitinol wire. Nitinol is a high strength material also known as a nickel titanium, where the two elements are present in roughly equal atomic percentages. Nitinol is a shape-memory alloy. In some examples, other shape-memory materials can be used as the plastic deformation element 714. In some examples, the plastic deformation element 714 can include copper/tin alloys, nickel aluminum, copper/zinc, silver/cadmium, indium/titanium, or any other suitable shape-memory alloy. In some examples, the rod 728 can include a diameter thickness between about 0.3 mm and about 1 mm. In some examples, the rod 728 can have a thickness of between about 0.35 mm and about 0.7 mm. In other examples, the rod 728 can have a thickness of about 0.6 mm. In other examples, the plastic deformation element 714 can be another suitable shape, such as a panel or polygonal shape.

Figure 7B:
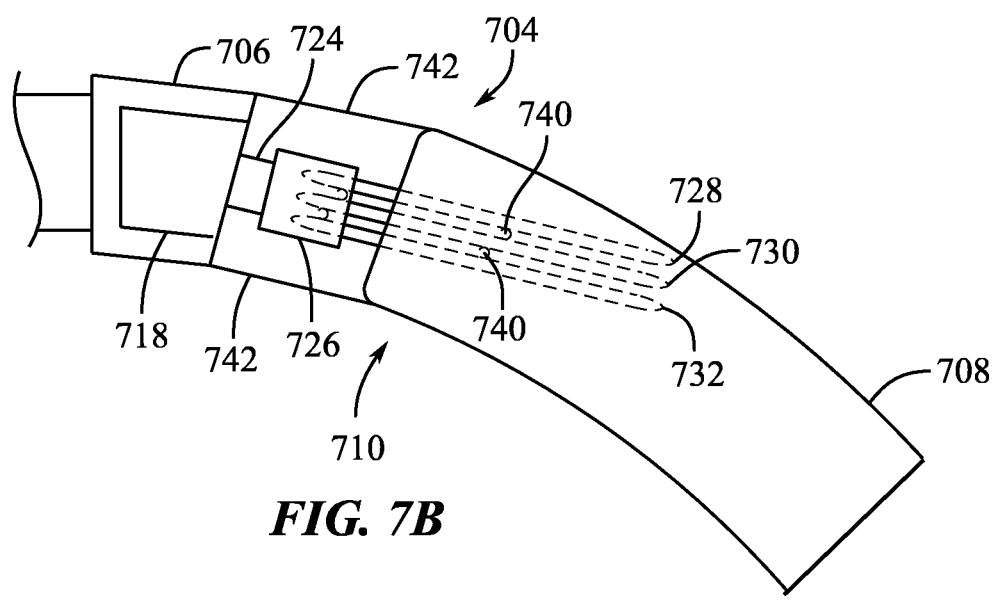
FIG. 7B shows a partial cross-sectional view of a securement arm of an optical device.

Referring to FIG. 7B, in some examples, the rod 728 can be a first rod and the plastic deformation element 714 can further include a second rod 730. In other examples, the plastic deformation element 714 can further include a third rod 732. The rods 728, 730, 732 can extend into the distal second portion 708 of the securement arm 704. In some examples, the rods can be coupled together with a connector 740. The connector 740 can include a nitinol material or other suitable material. In some examples, the connector 740 can strengthen the rods 728, 730, 732 and secure the rods 728, 730, 732 within the second portion 708.

In some examples, the securement arm 704 can further include a sleeve 742. The spring element 710 can be disposed within the sleeve 742. In some examples, at least a part or portion of the first and second portions 706, 708 of the securement arm 704 can be disposed within the sleeve 742. The sleeve 742 can function as a barrier between the spring element 710 and the skin or hair of a user. In other words, in some examples, the sleeve 742 can keep any portions or components that move relative to each other away from the hair or skin of the user to protect the user from pinching or scratching by the securement arm 704 components and can interfere with the function of the spring element 710. In some examples, the sleeve 742 can include at least one of elastane, a polyether-polyurea copolymer, a nylon, or a neoprene. In other examples, the sleeve 742 can include a hard or soft molded plastic such as polyethylene or a silicone material.

Any of the features, components, and/or parts, including the arrangements and configurations thereof shown in FIGS. 7A-7B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 7A-7B.

Figure 8A:
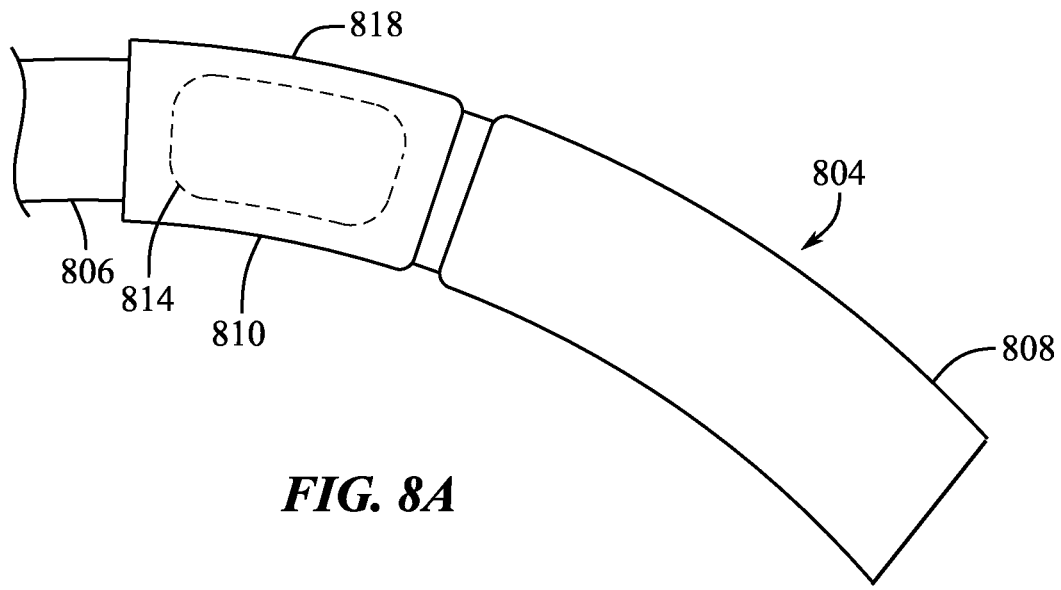
FIG. 8A shows a side view of securement arm of an optical device.

FIG. 8A shows a side view of an example of a securement arm 804 of a head-mountable device. The securement arm 804 can include a first portion 806 and a second portion 808. Similar to the other embodiments discussed, the securement arm 804 can include a spring element 810 having plastic deformation element 814 and elastic element 818. In some examples, the spring element 810 can include the elastic element 818 over molded onto the plastic deformation element 814. In other words, the plastic deformation element 814 can include a metallic panel or any of the plastic deforming elements described above and the elastic element 818 can include an overmold. In some examples, the over molding can include an injection molding process used to mold an elastic element 818 over top of the plastic deformation element 814. In one example, the injection molding process can include a slightly larger thickness of the elastic element 818 applied to the securement arm 804 to mitigate any shrinkage of the elastic element 818. In other words, during the injection molding process, shrinkage of the elastic element 818 can be taken into account by adjusting the amount of material injected into the mold or adjusting the size of the mold such that upon shrinkage, the elastic element 818 aligns as desired with the first portion 806. In some examples, the elastic element 818 can include a thermoplastic elastomer, a silicon, or other suitable material.

Figure 8B:
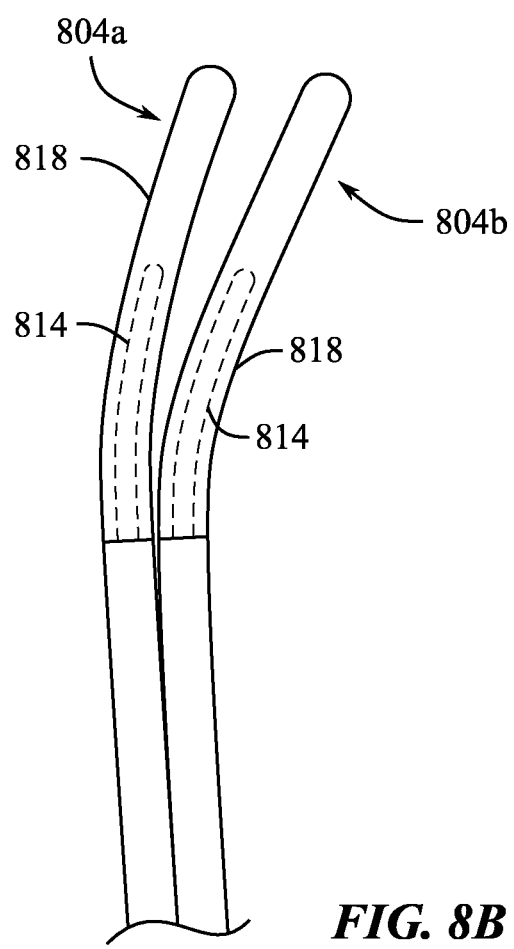
FIG. 8B shows a top view of the securement arm of FIG. 8A in various adjusted positions.

FIG. 8B shows a first over molded securement arm 804a and a second over molded securement arm 804b. As shown, the elastic element 818 is disposed over the plastic deformation element 814. The plastic deformation element 814 retain the bent shape of securement arm 804b after a force has been applied, when compared to the securement art 804a. For example, the securement arm 804b can include an angle 8° more acute than securement arm 804a. In some examples, the plastic deformation element 814 can be configured to retain the bent shape when the plastic deformation element 814 is bent greater than 15°. In other examples, the plastic deformation element 814 retains the bent shape when the plastic deformation element 814 is bent greater than 10°, greater than 20°, or greater than 25°.

In some examples, the plastic deformation element 814 can include a taper. In other words, the plastic deformation element 814 can include a greater thickness at a proximal end of the plastic deformation element 814 and a lesser thickness at a distal end of the plastic deformation element 814. The plastic deformation element 814 can include a taper to distribute stress from the force of bending along the length of the plastic deformation element 814. In other words, the taper can contribute to the bent shape being rounded and not kinked, which can improve comfort for the wearer or user.

In other examples, the plastic deformation element 814 does not include a taper. For example, the thickness of the plastic deformation element 814 can be greater than about 0.3 cm, greater than about 0.4 cm, or greater than about 0.5 cm. In some examples, the thickness of the plastic deformation element 814 can be in a range between about 0.2 cm and about 0.4 cm, between about 0.3 cm and about 0.5 cm, or between about 0.3 cm and about 0.5 cm. In other examples, the plastic deformation element 814 can be about 0.5 cm at the proximal end and about 0.35 cm at the distal end.

Any of the features, components, and/or parts, including the arrangements and configurations thereof shown in FIGS. 8A-8B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 8A-8B.

Figure 9A:
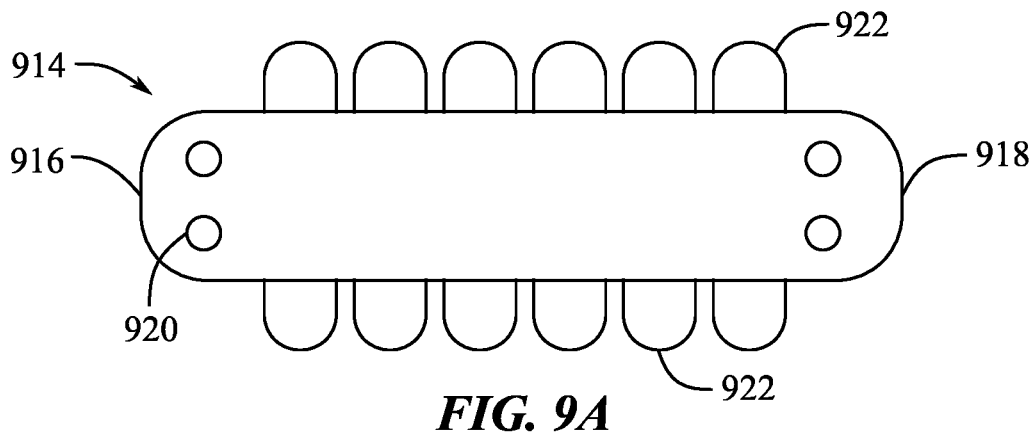
FIG. 9A shows a side view of an elastic element of a spring element of a securement arm.

FIG. 9A shows an example plastic deformation element 914 that can be disposed within an over molded elastic element. In some examples, the plastic deformation element 914 can include a flat, elongated panel having a proximal end 916 and a distal end 918. In some examples, the plastic deformation element 914 can be oriented vertically such that the plastic deformation element 914 can be bent to further tighten or loosen a securement arm to the user's head. In other words, the plastic deformation element 914 can be subjected to an adjustment while remaining parallel with the ground. In some examples, the proximal end 916 can be configured to attach to a proximal portion of a securement arm (not shown) and the distal end 918 can be configured to attach to a distal portion of a securement arm. The plastic deformation element 914 can attach via a screw or fastener, an adhesive, a rivet, or other suitable attachment mechanism. The plastic deformation element 914 can include through holes 920 located at the proximal end 916 and distal end 918 for this purpose. In some examples, the plastic deformation element 914 can include a flexible tab 922 extending from an exterior edge of the plastic deformation element 914. In other words, the plastic deformation element 914 can include an elongated flat panel having a tab 922 extending therefrom. The tab 922 can be bent to a front side or a backside of the plastic deformation element 914 to interlock with the elastic element and provide a better attachment to the over molded elastic element and to provide a limit to the adjustment angle of the plastic deformation element 914.

Figure 9B:
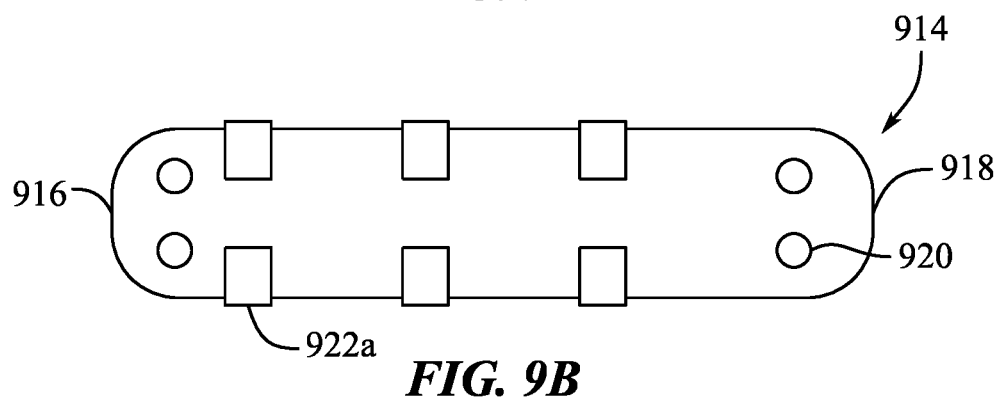
FIG. 9B shows a side view of an elastic element of a spring element of a securement arm.
Figure 9C:
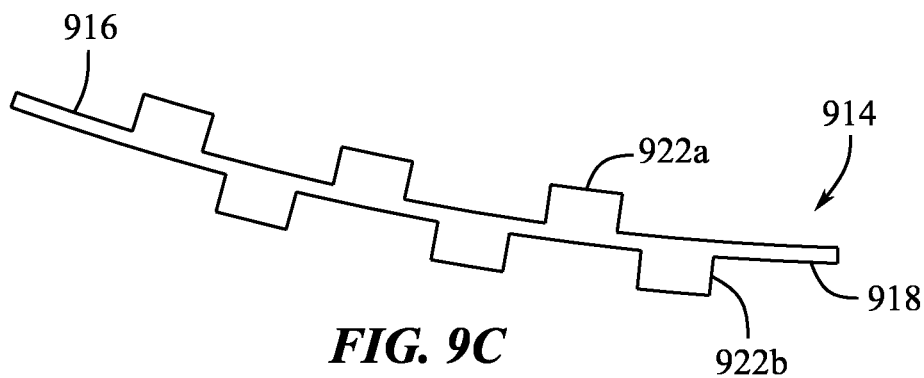
FIG. 9C shows a top view of an elastic element of a spring element of a securement arm.

FIGS. 9B and 9C show an example plastic deformation element 914 including the tab 922. FIG. 9B is a side view of the plastic deformation element 914 of FIG. 9A. In some examples the tab 922 can be a first tab 922a and the plastic deformation element 914 can include a second tab 922b. In some examples, the first tab 922a can be bent to a front side of the plastic deformation element 914 and the second tab 922b can be bent to the backside. FIG. 9B shows the plastic deformation element 914 with some tabs 922a bent toward the front of the plastic deformation element 914 and some tabs 922b bent toward the back of the plastic deformation element 914. As shown in FIG. 9C, a top view of the plastic deformation element 914, in some examples, the tabs 922a, 922b can form a vertebrae structure down the length of the plastic deformation element 914. By alternating the direction of the tabs 922a, 922b, the plastic deformation element 914 can be better secured within the over molded elastic element and also when the plastic deformation element 914 is bent and/or adjusted, the tabs 922a extending to the front of the panel can either contact each other or create resistance to bending in coordination with the over molded elastic element, forming a resistance limit to the adjustment angle. Similarly, the tabs 922b extending to the back of the panel can contact each other or coordinate with the elastic element to increase resistance and limit the adjustment angle in the other direction.

Figure 9D:
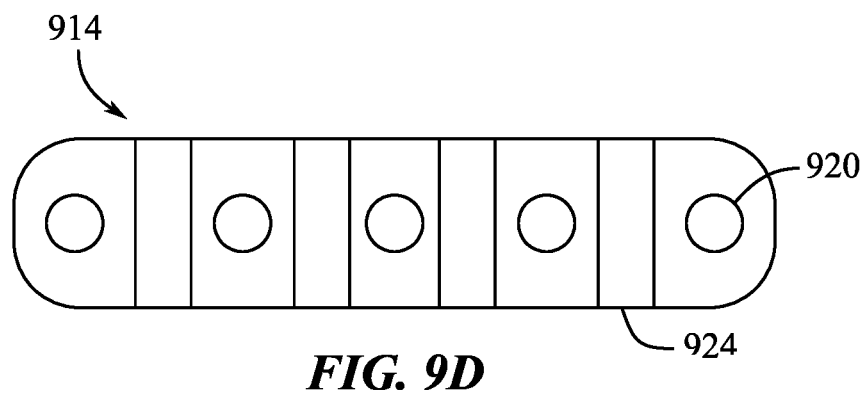
FIG. 9D shows a side view of an elastic element of a spring element of a securement arm.

FIG. 9D shows a side view of another plastic deformation element 914. In some examples, the plastic deformation element 914 can include a series of through holes 920 extending the length of the elongated panel. The through holes 920 can interlock with the elastic element that is over molded on the plastic deformation element 914. In some examples, as described above, the through holes 920 can be used to couple the plastic deformation element 914 with other components of a spring element and/or the proximal and distal portions of the securement arm, respectively. In some examples, the through holes 920 can interlock with an interposer to secure the plastic deformation element 914 to the distal and proximal portions of the securement arms.

Figure 9E:
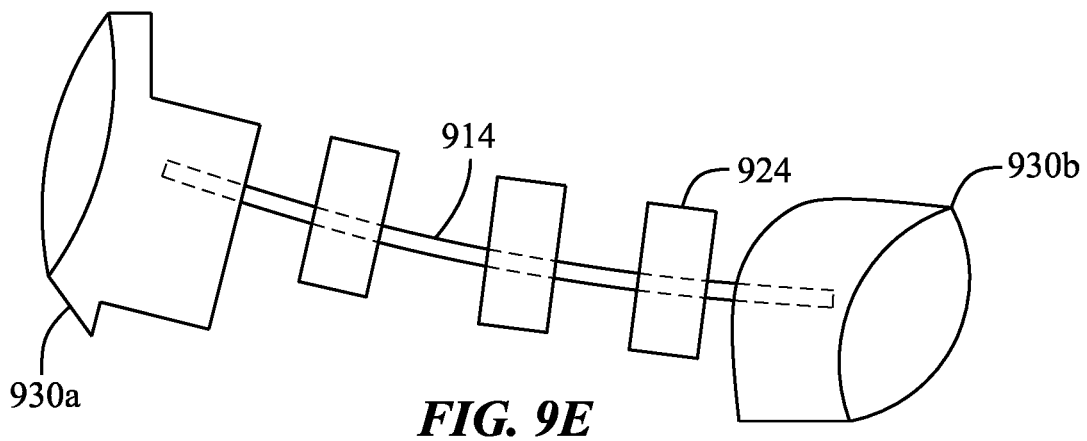
FIG. 9E shows a perspective view of an elastic element of a spring element of a securement arm.

In some examples, the plastic deformation element 914 can include segments and/or extensions 924 that extend from the flat panel to form the vertebrae structure. In some examples, the extensions 924 can be the same material as the plastic deformation element 914 and can be monolithically formed to the plastic deformation element 914 as shown in FIG. 9D. Referring to FIG. 9E, in some examples, the vertebrae structure can be formed with a second material over molded on the plastic deformation element 914. FIG. 9E shows a perspective view of a spring element 910 with the plastic deformation element 914 and an elastic element vertebrae structure with extensions 924. In some examples, the extensions 924 can include the over molded plastic material or other elastic material. In some examples, the spring element 910 can include an interposer 930. The interposer 930 can be configured to interlock with a first proximal portion of a securement arm. In some examples, the interposer 930 can be a first interposer 930a. A distal portion of the securement arm can include a second interposer 930b at least partially disposed within the distal portion and a portion of the spring element is connected to the second interposer 930b.

Any of the features, components, and/or parts, including the arrangements and configurations thereof shown in FIGS. 9A-9E can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 9A-9E.

Figure 10A:
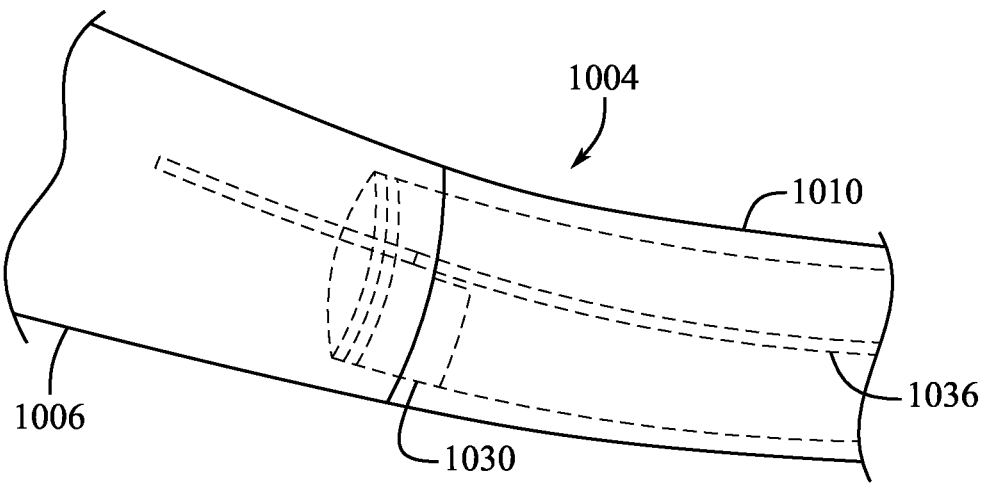
FIG. 10A shows a cross-sectional view of an interposer of a securement arm.

FIG. 10A shows a cross-sectional view of an interposer 1030 of a securement arm 1004. In some examples, the interposer 1030 can be at least partially disposed within a first portion 1006 of the securement arm 1004. In some examples, the interposer 1030 connects or attaches a spring element 1010 to the first portion 1006 of the securement arm 1004. In some examples, the interposer 1030 can include an aluminum and/or aluminum alloy material or a titanium and/or titanium alloy material. At least a portion of the spring element 1010 can be connected to the interposer 1030. The interposer 1030 can be connected to the first portion 1006 of the securement arm 1004 by at least one of a weld, an adhesive, a barb, or a snap feature disposed between an outer surface of the interposer 1030 and an inner surface of the first portion 1006 of the securement arm 1004. The interposer 1030 can be configured to retain the spring element 1010 connected to the first portion 1006 of the securement arm 1004 and to also provide access and/or an entry point to within the first portion 1006 of the securement arm 1004 and/or the spring element 1010. As noted above, the interposer can be attached to the first portion 1006 of the securement arm 1004 by an adhesive or a barb.

Figure 10B:
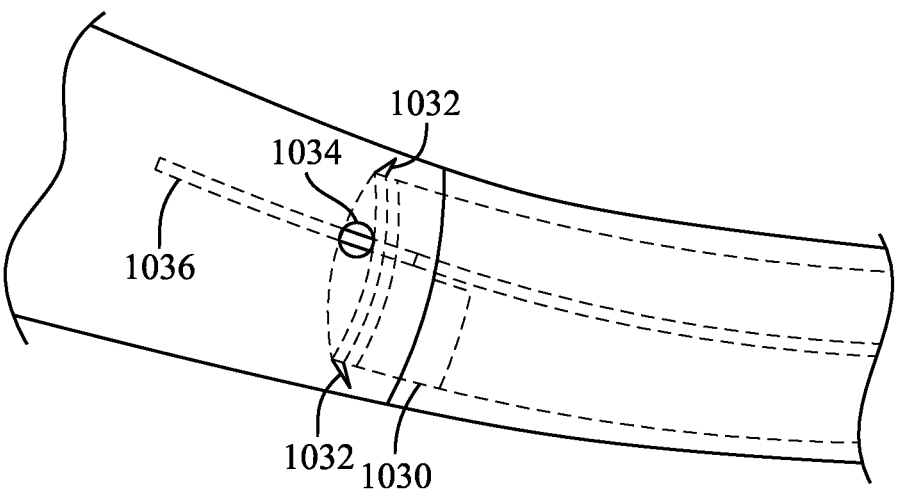
FIG. 10B shows a cross-sectional view of an interposer of a securement arm.

FIG. 10B shows an example interposer 1030 including a barb 1032. The barb 1032 can be configured to penetrate the inner surface of the first portion 1006 of the securement arm 1004 to retain the interposer 1030 therein, in some examples. In other examples, the barb 1032 can be a component of a snap feature, wherein the barb 1032 interlocks with an aperture or depression to nest the interposer 1030 with the first portion 1006 of the securement arm 1004. In some examples, the interposer 1030 can be constructed of a meatal material. Thus, the metallic barb 1032 can be strong to withstand bending forces without being dislodged. In some examples, the interposer 1030 can include a metallic core and barb 1032 with a silicon and/or plastic interface for an improved interference fit and/or better adhesion for an adhesive.

In some examples, the interposer 1030 can include at least one aperture 1034 extending there through. In some examples, an electrical connector 1036 can extend through the interposer, as described above with reference to FIG. 3. In some examples, at least a portion of a spring element 1010 (e.g., plastic deformation element) can also extend through the interposer 1030 or be retained by the interposer 1030. In some examples, the interposer 1030 can be connected to the spring element 1010 by at least one of a laser weld, a fastener, an ultrasonic weld, or a rivet. In other examples, the interposer 1030 can be connected to the spring element 1010 by an adhesive or as described above, at least a portion of the spring element 1010 can be integrated into the interposer 1030.

Any of the features, components, and/or parts, including the arrangements and configurations thereof shown in FIGS. 10A-10B can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 10A-10B.

Figure 11A:
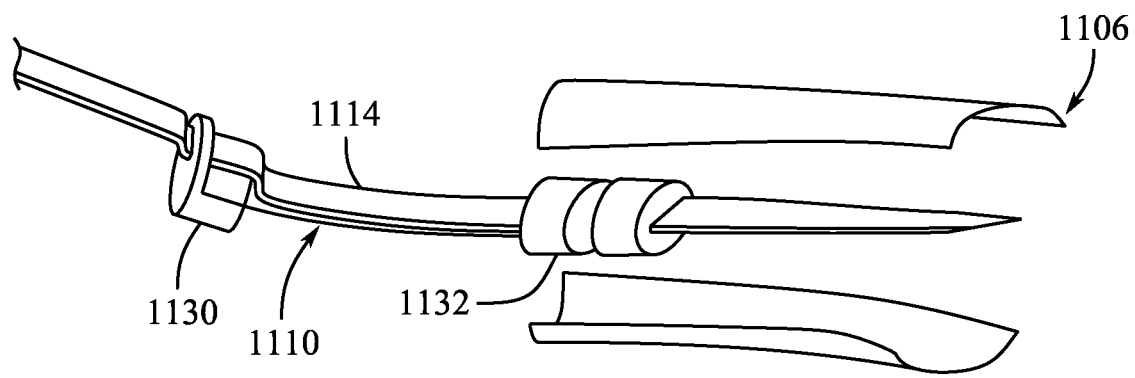
FIG. 11A shows a partial expanded view of components of a securement arm of an optical device.

FIG. 11A shows a partial expanded view of components of a securement arm 1104 of an optical device. The components include a spring element 1110 having a plastic deformation element 1114. In the example shown, the elastic element can be a plastic material over molded onto the plastic deformation element 1114, but other suitable spring element arrangements can be included. The securement arm 11104 also includes a first interposer 1130 configured to couple the spring element 1110 to a proximal portion of the securement arm (not shown). The first interposer 1130 can be at least partially disposed within the proximal portion. A second interposer 1132 is also shown. The second interposer 1132 is configured to be at least partially disposed in a distal portion 1108 of the securement arm 1104. The second interposer 1132 can include a metallic material and/or a plastic material. The second interposer 1132 can also include an aperture and the plastic deformation element 1114 can extend through the second interposer 1132 to secure the plastic deformation element 1114 within the securement arm 1104.

Figure 11B:
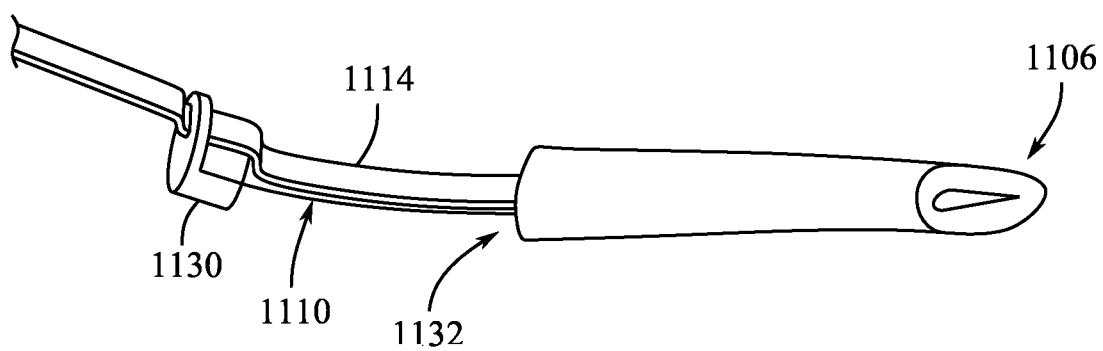
FIG. 11B shows a perspective view of components of a securement arm of an optical device.

Referring to FIG. 11B, the second interposer 1132 can be at least partially disposed within the second distal portion 1108 of the securement arm 1104. In some examples, the interposer 1132 connects or attaches the spring element 1110 to the distal portion 1108 of the securement arm 1104. At least a portion of the spring element 1110 can be connected to the interposer 1132. The interposer 1132 can be connected to the second distal portion 1108 of the securement arm 1104 by at least one of an adhesive, a barb, or a snap feature disposed between an outer surface of the interposer 1132 and an inner surface of the second portion 1108 of the securement arm 1104. The interposer 1132 can be configured to retain the spring element 1110 connected to the second portion 1108 of the securement arm 1104 and to also provide access and/or an entry point to within the second portion 1108 of the securement arm 1104 and/or the spring element 1110. As noted above, the interposer 1132 can be attached to the second portion 1106 of the securement arm 1104 by an adhesive or a barb.

Referring to FIG. 11A, in some examples, the second portion 1108 can be constructed of a first shell 1134 coupled to a second shell 1136 to define a prismatic volume. In some examples, the prismatic volume can be generally cylindrical or cubic, or can be any other suitable volume. In some examples, the first shell 1134 can be coupled to a second shell 1136 by a laser weld, an adhesive, or an interference fit. The prismatic volume can have components such as a portion of the spring element 1110 or electronic components disposed therein. In some examples, the electronic component can include a battery or a speaker and be connected to at least one other electronic component disposed within the first portion 1106 (not shown) of the securement arm 1104. The electronic components can be connected by an electrical connector that extends through the aperture of the second interposer 1132.

These components described herein can be interchanged and included in various embodiments of the disclosure. The securement arm can include multiple portions and one or more electronic components used to operate the head-mountable electronic device. These components can include any components used by the head-mountable electronic device to produce a virtual or augmented reality experience. The head-mountable electronic devices of the present disclosure include securement arms and components that can be altered and customized to each user and for each activity. Securement arms for devices described herein can be customized for the same device to be comfortably and effectively used by each of the multiple individuals using the device.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A securement arm for an optical device, comprising:
    a first portion including a first electronic component, the first portion connected to a viewing frame of the optical device;
    a second portion including a second electronic component;
    a spring element coupling the second portion to the first portion, the spring element comprising:
        a plastic deformation element; and
        an elastic element; and
    an electrical connector extending through the spring element and electrically connecting the first electronic component and the second electronic component.

2. The securement arm of claim 1, wherein the plastic deformation element defines an adjustment range of the angle of the first portion relative to the second portion, the range being between about −30° and about +30°.

3. The securement arm of claim 1, wherein the elastic element defines an adjustment range of the angle of the first portion relative to the second portion, the range being between about 0° and about 10°.

4. The securement arm of claim 1, wherein the elastic element comprises an elongated sheet metal panel.

5. The securement arm of claim 1, wherein the plastic deformation element comprises a crown gear engagement feature.

6. The securement arm of claim 5, wherein:
    the crown gear engagement feature comprises a push button;
    the crown gear and the crown gear engagement feature are disengaged to allow an adjustment of an angle of the spring element when the push button is pressed; and
    the crown gear and the crown gear engagement feature are engaged when the push button is released.

7. The securement arm of claim 1, wherein the plastic deformation element comprises a friction hinge.

8. The securement arm of claim 1, wherein:
    the plastic deformation element comprises a first material;
    the elastic element comprises a second material different from the first material; and
    the second material is at least partially embedded within the first material.

9. The securement arm of claim 8, wherein:
    the first material comprises stainless steel; and
    the second material comprises nitinol.

10. The securement arm of claim 1, wherein:
    the plastic deformation element comprises a pliable material having a first tempered region;
    the elastic element comprises the pliable material having a second tempered region; and
    the second tempered region comprises a different yield strength than the first tempered region.

11. A securement arm for an electronic device, comprising:
    a proximal portion including a first electronic component connected to a viewing frame of the optical device;
    a distal portion including a second electronic component;
    a spring element attaching the distal portion to the proximal portion, the spring element comprising:
        a plastic deformation element; and
        an elastic element;
    an electrical connector extending through the spring element and electrically connecting the first electronic component and the second electronic component; and
    an interposer at least partially disposed within the proximal portion, wherein:
        the spring element is connected to the interposer; and
        at least one of an adhesive, a barb, or a snap feature is disposed between an outer surface of the interposer and an inner surface of the proximal portion of the securement arm.

12. The securement arm of claim 11, wherein:
the interposer comprises a first interposer;
the distal portion comprises a second interposer at least partially disposed within the distal portion; and
the spring element is connected to the second interposer.

13. The securement arm of claim 11, wherein the interposer is connected to the spring element by at least one of a laser weld, a fastener, an ultrasonic weld, or a rivet.

14. The securement arm of claim 11, wherein the electrical connector comprises a planar flex or a cable.

15. The securement arm of claim 11, wherein:
the first electronic component comprises a battery; and
the second electronic component comprises a speaker.

16. A head-mountable electronic device, comprising:
a viewing frame; and
a securement arm extending from the viewing frame, the securement arm comprising:
    a proximal portion connected to the viewing frame, the proximal portion including a first electronic component; and
    a distal portion attached to the proximal portion by a spring element, the distal portion including a second electronic component, the spring element comprising:
        a plastic deformation element; and
        an elastic element over molded onto the plastic deformation element; and
    an electrical connector extending through the spring element and electrically connecting the first electronic component and the second electronic component.

17. The head-mountable electronic device of claim 16, wherein the plastic deformation element defines a through hole.

18. The head-mountable electronic device of claim 16, wherein:
the plastic deformation element comprises an elongated panel having a flexible tab extending from the panel; and
the flexible tab interlocks with the elastic element.

19. The head-mountable electronic device of claim 16, wherein:
the plastic deformation element comprises a metallic material; and
the elastic element comprises a silicon material.

20. The head-mountable electronic device of claim 16, wherein:
the distal portion comprises a first shell coupled to a second shell to define a prismatic volume; and
the second electronic component is disposed within the prismatic volume.

* * * * *